United States Patent

Kozakura et al.

[11] Patent Number: 5,989,141
[45] Date of Patent: Nov. 23, 1999

[54] SILENT CHAIN

[75] Inventors: Nobuto Kozakura; Tsutomu Haginoya; Masaaki Matsumoto, all of Saitama, Japan

[73] Assignee: Tsubakimoto Chain Co., Osaka, Japan

[21] Appl. No.: 08/716,992

[22] Filed: Sep. 20, 1996

[30] Foreign Application Priority Data

Jan. 24, 1996 [JP] Japan .................................... 8-010101

[51] Int. Cl.⁶ .................................................. F16G 13/02
[52] U.S. Cl. ..................... 474/230; 474/213; 474/228; 474/226; 474/206
[58] Field of Search .................................. 474/230, 212, 474/213, 214, 206, 228, 226

[56] References Cited

U.S. PATENT DOCUMENTS

| 953,114 | 3/1910 | Belcher | 474/213 |
|---|---|---|---|
| 958,466 | 5/1910 | Belcher | 474/213 |
| 959,047 | 5/1910 | Belcher | 474/213 |
| 1,020,180 | 3/1912 | Belcher | 474/213 |
| 1,578,271 | 3/1926 | Dull et al. | 474/214 |
| 4,906,224 | 3/1990 | Reber | 474/214 X |
| 4,915,675 | 4/1990 | Avramidis | 474/213 |

*Primary Examiner*—John J. Calvert
*Assistant Examiner*—Gary L. Welch
*Attorney, Agent, or Firm*—Armstrong, Westerman, Hattori, McLeland, and Naughton

[57] ABSTRACT

A silent chain can prevent the link plates from rupturing and stretching in the longitudinal direction to the chain. The silent chain is formed such that the thickness of both the outer link plates of the joint link row having fewer plates on the connecting pin is made larger than any of thicknesses of the guide plates and the thicknesses of the other link plates.

1 Claim, 1 Drawing Sheet

SILENT CHAIN

FIELD OF THE INVENTION

The present invention relates to a silent chain for transmitting power by being hung and turned on a pair of sprockets which are disposed in parallel to each other with a certain space between each other.

BACKGROUND OF THE INVENTION

A silent chain is disclosed in the U.S. Pat. No. 4,915,675. According to the specification and drawings of U.S. Pat. No. 4,915,675, a plurality of link plates having engagement teeth engaging with sprocket teeth are disposed in parallel such that a connecting pin is put through holes on the link plates and chained in sequence longitudinally. In a plate row having fewer link plates, guide plates not having teeth engaging with the sprocket teeth, in which both ends of the connecting pin are pressed and fit, are disposed in parallel, and a guide link row having (n+1)plates are formed with other inner plates. A plate row having more link plates forms a joint link row consisting only of (n) link plates not having guide plates.

Therefore, when a tensile load is applied in the longitudinal direction to the silent chain, the load applied on each of the link plates of a joint link row consisting of (n) link plates becomes higher than the load applied on each of two guide plates and (n–1) link plates which form a guide link row of (n+1) plates; and therefore, the link plates of the joint link row are apt to rupture. In the aforementioned U.S. Pat. No. 4,915,675 in view of this problem, the thickness of each of the (n) link plates of the joint link row is made larger than that of each of (n–1) link plates of the guide link row consisting of (n+1) plates, so that the rupture strength of each of two guide plates and (n–1) link plates of the guide link row consisting of (n+1) plates can balance that of each of (n) link plates of the joint link row, thereby avoiding rupture of the link plates of the joint link row.

In the prior art described above, the plates of the guide link row and the joint link row are made balanced in rupture strength and thereby protected from rupture.

However, both ends of the connecting pin are pressed and fit in the holes of the guide plates not having teeth engaging with the sprocket teeth. And, each of the connecting pin holes on the link plates interposed in the guide link row, having teeth engaging with the sprocket teeth, has a free play gap with respect to the connecting pin. And, each of the connecting pin holes on the link plates of the joint link row has a free play gap with respect to the connecting pin. And, if a low tensile load is applied to the guide link row and the joint link row in the longitudinal direction of the chain, the holes for the intermediate link plate G1 and G2 of the guide link row do not come into contact with the connecting pin, as both ends of the connecting pin are pressed and fit in the guide plates. However, the holes for the link plate L1–L3 of the joint link row come into contact with the connecting pin at hole edges K on the opposite side of the direction that the tensile load is working, as shown in FIG. 2.

Next, if a high tensile load is applied to the longitudinal direction to the chain, a deflection is induced on the side of the joint link row which has more link plates engaging directly with the sprocket teeth on the intermediate part of the connecting pin, and as shown in FIG. 3, the intermediate part of the connecting pin deforms largely in a barrel shape towards the side of the joint link row L. Consequently, guide plates GL bend outwardly.

Further, a load working on the hole edges H of the intermediate link plates of the joint link row is lower than the load working on the hole edges E of the link plates on both ends of the joint link row. However, a locally concentrated load is applied on the connecting pin hole edges E on both the outer link plate L2, L3 of the joint link row L, due to end tooth bearing accompanied by the barrel-shaped deformation of the connecting pin. Abrasions of the connecting pin and the hole edges E of the link plates are enlarged, which can cause not only abrasion stretch in the chain, but also rupture due to an unbalanced load.

SUMMARY OF THE INVENTION

The present invention provides a silent chain in which (n+1) plates of a guide link row consisting of guide plates and link plates are chained to (n) link plates forming a joint link row on a connecting pin, wherein a thickness of outer link plates disposed on both ends of the joint link row is made larger than the thickness of any plates of other inner link plates of the joint link row and guide plates on both ends and inner plural link plates of the guide link row, and the thickness of intermediate link plates disposed inside of the joint link row is made virtually identical to that of the link plates of the guide link row, and the thickness of the guide plates of the guide link row is made larger than that of any link plates of the guide link row.

Since the thickness of the link plates on both outsides of the joint link row having fewer plates than the guide link row is made larger than that of any plates of the intermediate link plates disposed inside of the joint link row and the guide plates and link plates of the guide link row, the guide link row and the joint link row have a balanced rupture strength against a tensile load, thereby preventing rupture in the link plates of the joint link row.

Since unbalanced load is also eased, abrasions of the connecting pin and link plate due to edge tooth bearing are prevented.

Further, since the thickness of the intermediate link plates disposed inside of the joint link row is made virtually identical to that of the link plates of the guide link row, the length of the connecting pin does not become longer than needed and tensile loads on the side of the guide link row and joint link row become virtually identical in the intermediate part of the connecting pin, thus preventing the connecting pin from bending in the intermediate part.

Furthermore, since the thickness of the guide plates of the guide link row is made larger than that of the intermediate link plates disposed inside of the guide link row, bending strength to prevent bending deformation of the connecting pin can be maintained if a tensile load by a link plate of the maximum thickness of the link plates on both the outsides of the joint link row is applied on both ends of the connecting pin.

DETAILED DESCRIPTION OF THE INVENTION

Figure 1:
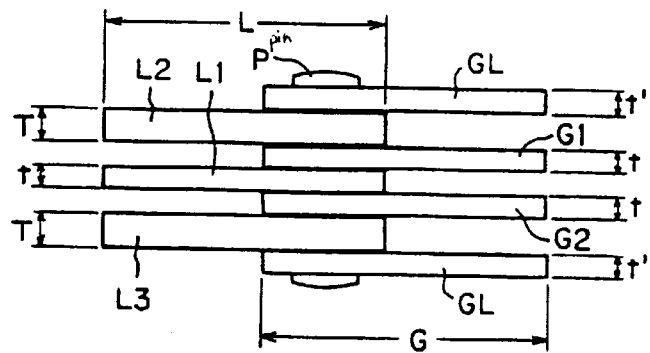
FIG. 1 is a plan view showing an essential part of the silent chain of the present invention.
Figure 2:
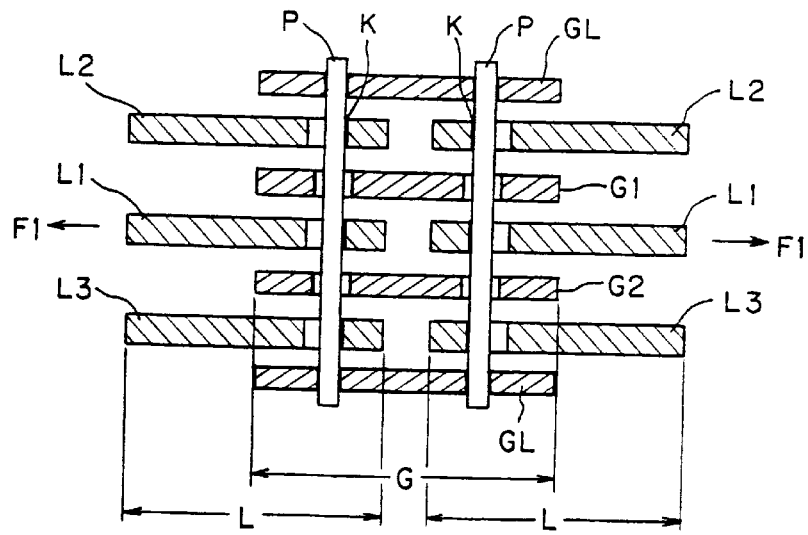
FIG. 2 is an exploded sectional plan view showing a positional relation between the connecting pin hole of each of the link plates and the connecting pin when a low tensile load F1 is applied on a conventional silent chain.
Figure 3:
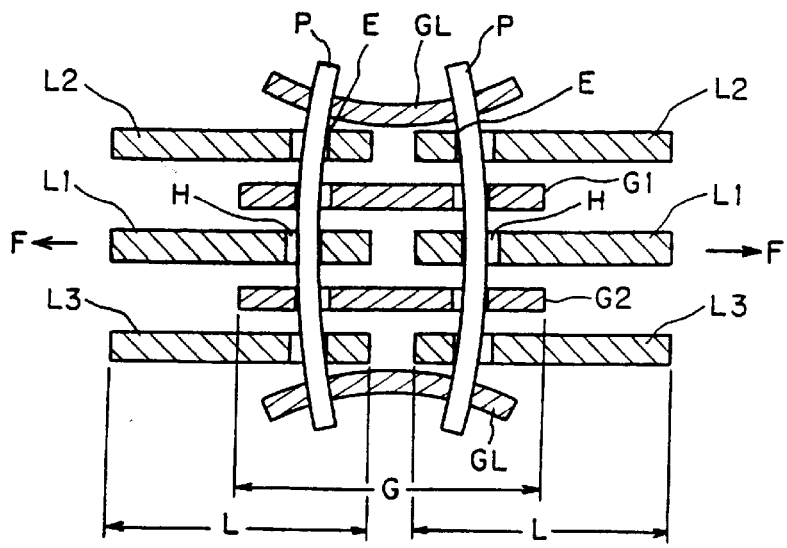
FIG. 3 is an exploded sectional plan view of a deformation of the guide plates and the connecting pins when a high tensile load F is applied on the conventional silent chain.

FIG. 1 is a plan view showing essential parts of a silent chain of the present invention. The silent chain includes of a joint link row L formed by link plates L1, L2, L3 having teeth engaging with the sprocket teeth and a guide link row G formed by guide plates GL, GL not having teeth engaging with the sprocket teeth and link plates G1, G2 having teeth engaging with the sprocket teeth, which are connected in a chain by a connecting pin P.

The link plate L2 and L3 disposed on both outer sides of the joint link row L each have a thickness T, for example 1.5 mm. The thickness T is larger than the thickness t of any of the intermediate link plate L1 disposed inside of the joint link row L, the guide plates GL, GL disposed outermost in the guide link row G, and the link plates G1, G2 disposed inside. The thickness t of the intermediate link plate L1 of the joint link row L, for example 1 mm, is almost identical to that of the link plates G1 and G2 of the guide link row G. The thickness t' of the guide plates GL, GL each is desired to be slightly larger than that of the link plates G1, G2. Namely, the relation of the plate thickness is shown by the inequality: T>t'>t.

Since the joint link row L is formed by three plates of the link plates L1–L3 and the guide link row G is formed by four plates (i.e., two guide plates GL, GL and two link plates G1, G2,), the thickness T of each outer link plate L2, L3 of the joint link row L is larger than the foregoing thickness t and t' in order to balance the tensile strength in the longitudinal direction of the chain on the side of the joint link row having fewer plates and the guide link row having more plates.

A tensile load, by engagement of the sprocket teeth with the link plate L1–L3 on the side of the joint link row L and the link plates G1, G2 disposed inside of the guide plates GL, GL on the side of the guide link row G, is applied onto the intermediate part of the connecting pin P having both ends pressed and fitted into the pin holes of the guide plates GL, GL. The tensile load by the three link plates L1–L3 is applied on the side of the joint link row L, and the tensile load by the two link plates G1, G2 is applied on the side of the guide link row G. Therefore, if the thickness of the intermediate link plate L1 disposed inside of the joint link row L is made larger than the thickness of each of the link plates G1, G2 on the side of the guide link row G, not only the length of the connecting pin P becomes longer than needed, but also a bending deformation is induced on the intermediate part of the connecting pin P due to a high bending moment acting on the intermediate part of the connecting pin P toward the joint link row L. However, making the thickness of the link plate L1 of the joint link row L almost identical to that of the link plates G1, G2 of the guide link row G will keep short the length of the connecting pin, which will reduce the foregoing bending moment and restrain the bending deformation.

According to the present invention, the thickness of the plates on both outer sides of the joint link row having fewer plates on the connecting pin is made larger than that of any of the guide plates and link plates of the guide link row.

Thus, the tensile strength in the longitudinal direction of the chain on the connecting pin is balanced on the joint link row and the guide link row. Thereby, the rupture strength of each link plates is made uniform, the link plates are protected from the problem of rupturing due to locally concentrated loads, and local abrasions of the connecting pin and the hole edges on the link plates are reduced because unbalanced loads are restrained.

Further, making the thickness, of the intermediate link plate disposed inside of the joint link row having more link plates engaging with the sprocket teeth on the connecting pin, almost identical to the thickness of the link plates of the guide link row will shorten the length of the connecting pin, reduce a bending moment acting on the intermediate part of the connecting pin toward the joint link row L, and reduce the occurrence of a bending deformation of the intermediate part of the connecting pin. Furthermore, making the thickness of the guide plates not engaging with the sprocket teeth of the guide link row larger than that of other link plates of the guide link row will enhance rigidity against a bending load applied on the guide plates in which both ends of the connecting pin are pressed and fitted when a bending moment is acted on the intermediate part of the connecting pin, and restrain a bending deformation on the intermediate part of the connecting pin.

Making the thickness of the intermediate link plates disposed inside of the joint link row almost identical to that of the link plates of the guide link row will reduce the weight of the chain, which reduces centrifugal added tension, improve reliability such as abrasion stretch resistance and wear resistance, and enhance operation efficiency by reducing loss by friction between the connecting pin and the insertion hole, and between the sprocket teeth and the link teeth.

The silent chain emits a metallic sound due to elastic vibration caused by collisions while engaging the link plates with the sprocket. However, since the thicknesses of the link plates in the joint link row are not equal, characteristic frequencies by each plate are different, which will reduce noises by a muting effect due to cross interference of the generated frequencies. Making the weight lighter can also reduce collisional sounds when the link plates engage with the sprocket teeth.

Therefore, according to the present invention, the rupture strength of every link plate is made approximately equal, local rupture of the link plates is prevented, a bending deformation on the intermediate part of the connecting pin is restrained, an abrasion stretch of the silent chain is prevented, abnormal engagement of the sprocket teeth with each of the link plates is prevented and normal engagement is maintained. Thus, the performance of the silent chain is enhanced.

What is claimed is:

1. A silent chain, comprising:
   a connecting pin;
   a joint link row including at least three link plates; and
   plates of a guide link row numbering one more than the number of link plates in the joint link row and including two guide plates and at least two of said link plates disposed between said two guide plates, said plates of said guide link row being chained to said link plates of said joint link row on said connecting pin,
   wherein two outer ones of said link plates of said joint link row disposed on opposite ends of said joint link row have a first thickness which is greater than a thickness of any other link plates of said joint link row and which is greater than all of said guide plates and said link plates of said guide link row, at least one intermediate link plate disposed between said two outer link plates of said joint link row has a second thickness which is virtually identical to that of said link plates of said guide link row, and said two guide plates of said guide link row have a third thickness which is greater than the thickness of said link plates of said guide link row.

* * * * *